United States Patent [19]
Gutterman et al.

[11] Patent Number: 4,854,660
[45] Date of Patent: Aug. 8, 1989

[54] LINEAR TRANSLATION SWITCH WITH OPTICAL FIBERS

[75] Inventors: Pamela R. Gutterman, Camp Hill; Sherry J. Harms, Humelstown; John C. Hoffer, Harrisburg, all of Pa.

[73] Assignee: AMP Incorporated, Harrisburg, Pa.

[21] Appl. No.: 217,907

[22] Filed: Jul. 12, 1988

[51] Int. Cl.$^4$ ............................................. G02B 6/32
[52] U.S. Cl. ............................... 350/96.18; 350/96.15; 350/96.2
[58] Field of Search ................. 350/96.15, 96.18, 96.2, 350/96.21

[56] References Cited

U.S. PATENT DOCUMENTS

| | | | |
|---|---|---|---|
| 3,886,544 | 5/1975 | Narodny | 340/365 P |
| 4,156,556 | 5/1979 | Klein et al. | 350/96.15 |
| 4,261,638 | 4/1981 | Wagner | 350/96.15 |
| 4,304,460 | 12/1981 | Tanaka et al. | 350/96.16 |
| 4,484,793 | 11/1984 | Laude | 350/96.2 |
| 4,516,827 | 5/1985 | Lance et al. | 350/96.15 |

FOREIGN PATENT DOCUMENTS

| | | | |
|---|---|---|---|
| 55-87107 | 7/1980 | Japan | 350/96.2 |
| 57-139704 | 8/1982 | Japan | 350/96.18 |
| 57-195203 | 11/1982 | Japan | 350/96.13 |

Primary Examiner—John D. Lee
Assistant Examiner—John Ngo

[57] ABSTRACT

An optical switch for switching the light output of one optical fiber into another optical fiber is disclosed. The optical switch includes an imaging system having a symmetry such as a spherical reflector. The switch also includes a group of optical fiber end faces including a first optical fiber end face via which light is transmitted to the imaging system and second and third fiber end faces. A translation mechanism is provided for linearly translating the group of fiber end faces and imaging system relative to one another between a first position in which the light from the first fiber end face is imaged by the imaging system into the second fiber end face and a second position in which light from the first fiber end face is imaged by the imaging system into the third fiber end face. The switch may be used to selectively remove a node from a fiber optic network having a ring like configuration.

11 Claims, 2 Drawing Sheets

LINEAR TRANSLATION SWITCH WITH OPTICAL FIBERS

FIELD OF THE INVENTION

The present invention relates to an optical switch for selectively coupling optical fibers.

BACKGROUND OF THE INVENTION

In many fiber optic applications, it is desirable to have a switch which in one switching state couples light emanating from a first optical fiber into a second optical fiber and which in another switching state couples light from the first optical fiber into a third optical fiber.

Illustratively, such a switch is useful in a fiber optic local area network implemented in a ring like configuration. Such a network comprises a plurality of nodes arranged in a ring, the nodes being interconnected by optical fibers. To transmit information from an originating node to a destination node by way of the ring like optical fiber network the information is transmitted from the originating node along the ring from one intervening node to the next until the destination node is reached. Illustratively, information arrives at a node via an incoming optical fiber. The incoming optical fiber is coupled to a receiver which converts the incoming information signal from optical to electrical form. Information leaves a node via an optical transmitter which converts a signal from electrical to optical form, the optical signal being transmitted out from the node via an outgoing optical fiber.

One problem with a fiber optic local area network having a ring configuration is that if one node fails the entire network or a significant portion thereof will be nonusable as no information can pass through a failed node. Accordingly, it is desirable to utilize an optical switch which has two switching states. In the first switching state light from an incoming fiber is coupled to a node receiver and light from the node transmitter is coupled to an outgoing fiber so that the node is inserted into the network. In the second switching state, the incoming and outgoing fibers are coupled so that the node is bypassed. When a node is bypassed in this manner, the network can continue to function despite a node failure.

In the event of a node failure or suspected node failure, a node should be tested by enabling the transmitter in the node to communicate via an optical path with the receiver in the node. Accordingly, it is desirable for the aforementioned optical switch, when in its second state, to optically couple the transmitter of the node to the receiver to enable the node to e tested.

An example of such an optical switch is disclosed in U.S. patent application Ser. No. 053,220, entitled "Fiber Optic Bypass Switch" filed on May 13, 1987 and assigned to Kaptron Inc. The contents of this application are incorporated herein by reference.

The optical switch disclosed in the above identified patent application is based on an imaging property of a spherical reflecting surface. In particular a point source of light slightly displaced from the center of curvature of the spherical reflector is imaged with minimal aberration at a point symmetrically located with respect to the center of curvature. The switch of the above identified patent application involves rotating a spherical reflector between first and second positions relative to an array of optical fiber end faces. Illustratively, there is an optical fiber end face (T) which terminates a fiber connected to the transmitter of a node and an optical fiber end face (R) which terminates a fiber connected to the receiver of the node. Two additional fiber end faces (I and 0) terminate the incoming fiber and the outgoing fiber respectively. There are also two other optical fiber end faces (L1 and L2) which correspond to the first and second ends of a fiber optic loop. Instead of utilizing fibers connected to the transmitter and receiver, these devices themselves may form part of the array.

In the first reflector position, the T and 0 end faces are conjugate (i.e. symmetrically located with respect to the center of curvature) and the I and R end faces are conjugate. Accordingly, light emanating from the input fiber end face (I) is imaged by the spherical reflector into the receiver fiber end face (R) and light emanating from the transmitter fiber end face (T) is imaged into the output fiber end face (0). Thus in its first position the switch of the present invention can be used to insert a node into a fiber optic network by coupling light from the incoming fiber to the receiver and light from the transmitter into the outgoing fiber.

In the second reflector position, the input and output fiber end faces (I and 0) have conjugate locations so that light from the incoming fiber is now imaged by the spherical reflector into the outgoing fiber instead of the receiver so that the node is bypassed. Simultaneously, in the second reflector position the transmitter fiber end face (T) and the first fiber loop end face (L1) are conjugate and the receiver fiber end face (R) and the second fiber loop end face (L2) are conjugate. Thus, light emanating from the transmitter fiber end face (T) is imaged by the reflector into the first fiber loop end face (L1). This light enters the fiber loop and emerges at the second fiber loop end face (L2). Light emanating from the second fiber loop end face (L2) is imaged by the reflector into the receiver fiber end face (R). Thus the transmitter and receiver are connected to each other by an optical path enabling the bypassed node to be tested. The fiber optic loop used in the testing path between the transmitter and receiver provides a suitable amount of attenuation so that the receiver is not saturated when the node is tested.

The operation of the switch of the above identified patent application may be summarized as follows. Light arrives via a first optical fiber (e.g. the incoming optical fiber) and may be imaged by a spherical reflector into a second optical fiber chosen from a plurality of available fibers (e.g. the receiver fiber or the outgoing fiber) depending on which of two positions the reflector is pivoted into.

One shortcoming of the switch described in the above identified patent application is that it depends for operation on pivoting a spherical mirror from a first position to a second position in order to switch from a first switching state to a second switching state. Such a pivoting design may not be sufficiently rugged and environmentally stable for certain network applications. In addition, the pivoting movement of the mirror may in certain applications impose an unacceptably long switching time between the first and second switching states.

Accordingly, it is an object of the present invention to provide an optical switch which relies on the symmetry of an imaging system to image light arriving via a first optical fiber into a second optical fiber when the switch is in one state and into a third fiber when the switch is in another (i.e. second) state, but which switch does not rely on a pivoting movement of a spherical reflector to switch between the two states.

It is a further object of the invention to provide a switch based on the symmetry of an imaging system, which switch in a first state couples radiation from an incoming optical fiber to the receiver of a node and radiation from the transmitter of the node to an outgoing fiber so that the node is inserted in a network, and which switch in a second switching state couples the incoming and outgoing fibers so that the node is bypassed and provides a path between the node transmitter and receiver so that the node may be tested.

SUMMARY OF THE INVENTION

The present invention is a switch for selectively coupling optical fibers. The switch includes an imaging system having a symmetry such as a spherical reflector. The switch also includes a group of optical fiber end faces including a first optical fiber end face via which light is transmitted to the imaging system and at least second and third optical fiber end faces. A translation mechanism is provided for linearly translating the imaging system and the fiber end face group relative to one another between two positions. In a first position, the first and second fiber end faces are conjugate with respect to the symmetry of the imaging system so that light from the first fiber is imaged by the imaging system into the second fiber. In a second position, the first and third fiber end faces are conjugate with respect to the symmetry of the imaging system so that light from the first fiber is imaged by the imaging system into the third fiber. Thus, it is possible to switch the light from the first fiber into the second fiber or into the third fiber depending on the position of the linear translation mechanism.

In an alternative embodiment of the invention, the group of optical fiber end faces may include four end faces. Illustratively, in a first position of the linear translation mechanism the first and second end faces are conjugate and the third and fourth end faces conjugate. Thus light from the first end face is imaged into the second end face and light from the third end face is imaged into the fourth end face. In a second position of the linear translation mechanism, the first and third end faces are conjugate so that light from the first end face is imaged into the third end face. Illustratively, the first end face is the end face of an incoming optical fiber, the second end face is the end face of a fiber connected to a node receiver, the third end face is the end face of a fiber connected to the node transmitter and the fourth end face is the end face of an outgoing fiber. Accordingly, in the first switch state, the incoming fiber and the node receiver are coupled and the node transmitter and outgoing fiber are coupled so that the node is inserted into a network. In the second switch state the incoming and outgoing fibers are coupled so that the node is bypassed. When the node is bypassed, it is desirable to provide an optical path between the node transmitter and the node receiver so that the node can be tested. This may be accomplished through use of a fiber loop having first and second end faces as discussed above.

The switch of the present invention provides significant advantages over the above described prior art switch based on the pivoting movement of a spherical reflector. First, a switch utilizing a linear translation mechanism does not necessarily require use of a spherical reflector. For example, a gradient index rod with a reflective coating on one end may be used as the imaging system. If a spherical reflector is used as the imaging system, reliance on a linear translation mechanism instead of the pivoting of the reflector provides significant benefits. The linear translation mechanism utilizes a relatively simple fiber/mirror geometry allowing ease in manufacturing. Because of the small movement involved, a switch utilizing a linear translation mechanism has a relatively fast switching time. A switch including a linear translation mechanism is more rugged and environmentally stable than a switch with a pivoting reflector. One reason for this is that with a linear translation system, it is not necessary to move the reflector at all, the switch may be implemented by moving the fiber end faces linearly with respect to the reflector.

DETAILED DESCRIPTION OF THE INVENTION

Figure 1A:
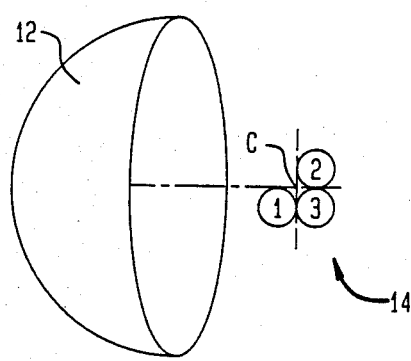
FIGS. 1A and 1B schematically illustrate the switching states of a fiber optic switch in accordance with an illustrative embodiment of the present invention.
Figure 1B:
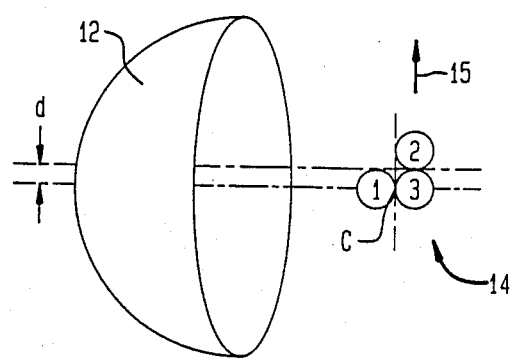

As indicated above, the present invention is a switch for switching the output of one optical fiber into another optical fiber. The inventive switch is schematically illustrated in FIGS. 1A and 1B. The switch of FIGS. 1A and 1B comprises a spherical reflecting surface 12. The spherical reflecting surface 12 has the property that a point source of light slightly displaced from the center of curvature C of the surface 12 is imaged with minimal aberration at a point symmetrically located with respect to the center of curvature. It is this property of the spherical surface 12 that allows light to be switched selectively from one fiber into another. Note, that instead of a spherical mirror any symmetric reflecting imaging system may be utilized in the switch of the present invention such as a graded index rod, i.e. a GRIN rod of symmetric pitch.

A group 14 of three optical fiber end faces is illustrated in FIGS 1A and 1B. These fiber end faces are labeled 1, 2, 3 respectively. For purposes of clarity in FIGS 1A and 1B (as in FIGS. 2A and 2B and FIGS. 3A and 3B) the fiber end faces are shown facing out of the plane of the drawing. However, in an actual switch (see FIG. 4) the fiber end faces are oriented towards the spherical mirror.

In FIG 1A, the end faces 1,2,3 are slightly displaced from the center of curvature C of the spherical reflector 12. More particularly, the fiber end faces 1 and 2 have conjugate locations with respect to the center of curvature C. Thus light emanating from the fiber end face 1 is imaged onto the fiber end face 2. In FIG 1B the group 14 of fiber end faces and the spherical reflector have been linearly translated a distance d relative to one another in the direction of the arrow 15. Illustratively, the distance d is on the order of half a fiber diameter when the fiber end faces 2 and 3 abut one another side to side as shown in FIGS 1A and 1B. After this movement, fiber end faces 1 and 3 have conjugate locations with respect to the center of curvature C. Light emanating from fiber end face 1 is now imaged by the reflector 12 into the fiber end face 3. Thus, by linearly translating the group 14 of fiber end faces and the reflector 12 relative to one another, it is possible to selectively switch between optical end faces 2 and 3.

Figure 2A:
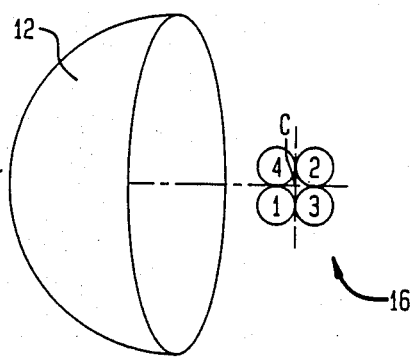
FIGS. 2A and 2B schematically illustrate the switching states of a fiber optic switch in accordance with a first alternative illustrative embodiment of the present invention.
Figure 2B:
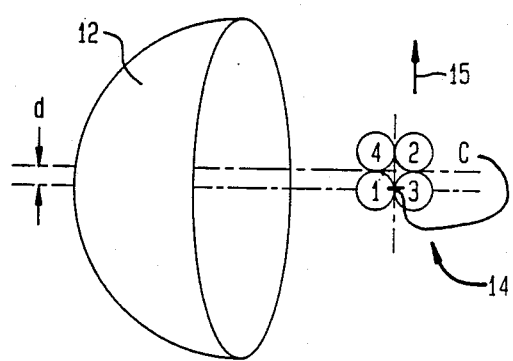

In FIG. 2A the group 16 now includes four fibers whose end faces are labeled 1,2,3,4. In FIG. 2A fiber end faces 1 and 2 have conjugate positions with respect to the center of curvature C and fiber end faces 3 and 4 have conjugate positions with respect to the center of curvature C. Accordingly, light emanating from fiber end face 1 is imaged by the reflector 12 into fiber end face 2 and light emanating from fiber end face 4 is imaged by the reflector 12 into the fiber end face 3. In FIG. 2B, the group 16 of fiber end faces and the reflector 12 have been linearly translated relative to one another by a distance d in the direction of arrow 15. In FIG. 2B only fiber end faces 1 and 3 have conjugate positions with respect to the center of curvature C. Thus light emanating from fiber end face 1 is now imaged by the reflector 12 into the fiber end face 3.

The switch of FIGS. 2A and 2B may be used to insert a node into or remove a node from a fiber optic network having a ring like configuration. Illustratively, the fiber end face 1 is the end face of an incoming optical fiber, the fiber end face 2 in the end face of a fiber connected to a node receiver, the fiber end face 3 is the end face of an outgoing fiber and the fiber end face 4 is the end face of a fiber connected to the node transmitter. Thus, in the switch state of FIG. 2A, the incoming fiber is connected to the node receiver and the outgoing fiber is connected to the node transmitter so that the node forms part of the network. In the switch state of FIG. 2B, the incoming fiber is connected to the outgoing fiber so that the node is bypassed.

Figure 3A:
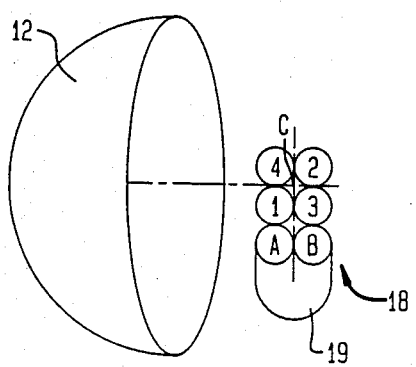
FIGS. 3A and 3B schematically illustrate the switching states of a fiber optic switch in accordance with a second alternative illustrative embodiment of the present invention.

In FIG. 3A, the group 18 includes four fibers having end faces 1,2,3,4. The group 18 also includes the end faces A and B of a fiber loop 19. In the switch state of FIG. 3A, fiber end faces 1 and 2 have conjugate positions with respect to the center of curvature C of the reflector 16 and fiber end faces 3 and 4 have conjugate positions with respect to the center of curvature C. As in FIG. 2A, in FIG. 3A light emanating from fiber end face 1 is imaged by the reflector 12 into fiber end face 2 and light emanating from fiber end face 4 is imaged by the reflector 12 into fiber end face 3. Accordingly, as in the case of FIG. 2A, when fiber end face 1 is the end face of an incoming fiber, fiber end face 2 is the end face of a fiber connected to a node receiver, fiber end face 4 is the end face of a fiber connected to a node transmitter and fiber end face 3 is the end face of an outgoing fiber, then the switch state of FIG. 3A serves to insert a node into an optical fiber network having a ring like configuration.

Figure 3B:
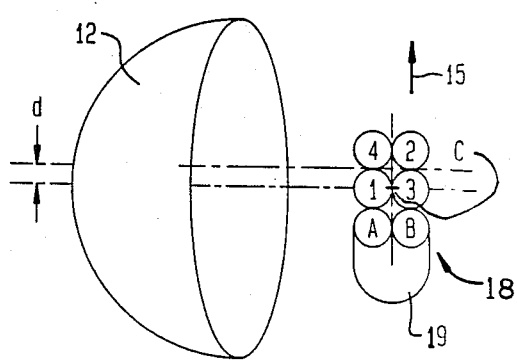

In FIG. 3B, the fiber group 18 and spherical reflector 12 have been linearly translated a distance d relative to one another in the direction of the arrow 15. In FIG. 3B, fiber end face 1 and 3 have conjugate positions with respect to the center of curvature C. This means that light emanating from fiber end face 1 is imaged by the reflector 12 into the end face 3. If end face I is the end face of an incoming optical fiber of a node and end face 3 is the end face of an outgoing optical fiber of a node, then in the switch state of FIG. 3B the node is bypassed as the reflector 12 provides an optical path between the incoming and outgoing fibers.

In FIG. 3B, fiber end face 4 is conjugate with the fiber end face B and the fiber end face A is conjugate with the fiber end face 2. Thus light emanating from fiber end face 4 is imaged by the reflector 12 into the end face B. This light then propagates along the fiber loop 19 and emanates from end face A. The light emanating from end face A is then imaged by the reflector 12 into end face 2. Accordingly, there is established an optical path between end face 4 and end face 2 simultaneously with the establishment of an optical path between end face 1 and end face 3. Thus, if end face 4 is the end face of a fiber connected to a node transmitter and end face 2 is the end face of a fiber connected to a node receiver, then an optical path is provided between the node receiver and the node transmitter, simultaneously with a path between the incoming and outgoing fibers. This enables a bypassed node to be tested.

Figure 4:
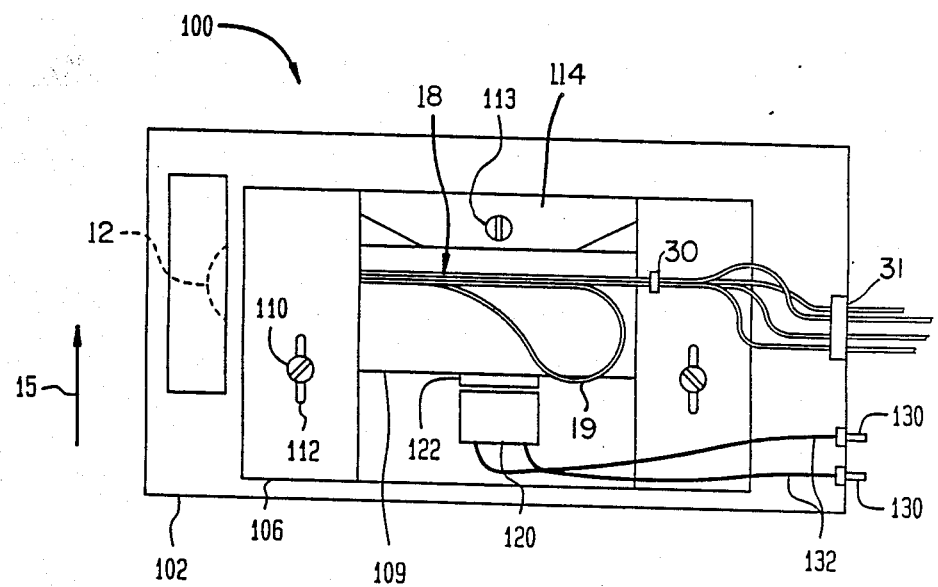
FIG. 4 illustrates an actual implementation of the switches of FIGS. 1A, 1B, 2A, 2B, 3A, and 3B.

FIG. 4 schematically illustrates an actual embodiment of the switches of FIGS. 3A and 3B. The switch 100 of FIG. 4 comprises a base 102. Fixedly mounted on the base 102 is the spherical reflector 12. The switch 100 also includes a subassembly 106. The ends 18 (see FIGS. 3A, 3B) of a group of optical fibers are mounted on a movable substrate 109 which forms part of the subassembly 106. Illustratively, the fiber group includes the fiber loop 19, which as indicated above may be used to test a bypassed node. The end faces of the fibers are oriented towards the spherical reflector 12 and are arranged with respect to the center of curvature of the spherical reflector 12 so that the spherical reflector 12 provides optical paths between certain fiber pairs. More particularly, the end faces are arranged in two parallel rows as shown in FIGS. 3A, 3B. One end of the fiber loop 19 is in one row and the other end is located in the other row. In FIG. 4, the fibers (excluding the loop 19) are maintained in position by the support structures 30, 31.

The end faces of the fibers may be polished or cleaved. Polished end faces are provided by a polishing operation to all the fiber ends after the fiber ends have been positioned on the substrate 109. The advantage of cleaved end faces is that the fibers are assembled in precisely defined positions on the substrate 109 after the end faces have been cleaved. Particularly, the cleaved end faces of the fiber loop 128 can be adjusted fore and aft along the axis of the reflector to vary the optical attenuation of an optical signal reflected by the reflector into a cleaved end face of the fiber loop. An end face of the fiber loop at a position other than at the focal point of the reflector will produce additional attenuation. In addition, end faces of the cleaved fibers can be positioned tangential to an imaginary sphere having the same curvature as the mirror. Polishing the ends of fibers along the same imaginary sphere would be more difficult to achieve than adjusting cleaved ends of fibers in position along the imaginary sphere.

The screws 110 are mounted in the slots 112 and are used for initial alignment of the subassembly 106 with respect to the reflector 12. More particularly, when the screws 110 are loosened, the slots 112 serve as guides for the subassembly 106. Once initial alignment is achieved, i.e. once the subassembly is positioned for a first switching state, the screws 110 are tightened.

To move the switch from a first switching state to a second switching state (i.e. a state in which optical paths are provided between different pairs of fibers than in the first switching state), the solenoid 120 and magnet 122 are used to linearly translate the movable substrate 109 in the direction of arrow 15. The permanent magnet 122 is mounted to the substrate 109. Illustratively, in the first switching state the solenoid 120 is off. When the solenoid 120 is activated by way of connectors 130 and leads 132, the magnet 122 is repelled and the subassembly is moved against adjustable stop 114 as shown in FIG. 4 so that the second switching state is realized. The position of the stop is adjustable by means of screw 113.

Finally, the above described embodiments of the invention are intended to be illustrative only. Alternate embodiments may be devised by those skilled in the art without departing from the spirit and scope of the following claims.

We claim:

1. An optical fiber switch comprising:
    an imaging system having a symmetry,
    a group of optical fiber end faces including a first optical fiber end face via which light is transmitted to said imaging system and at least second and third optical fiber end faces, a fourth fiber end face via which light is transmitted to said imaging system, and fifth and sixth fiber end faces being the end faces of an optical fiber loop, and
    means for linearly translating said group of fiber end faces and said imaging system relative to one another between a first position and a second position,
    in said first position, light from said first fiber end face is imaged into said second fiber end face and light from said fourth fiber end face is imaged into said second fiber end face and light from said fourth fiber end face is imaged into said third fiber end face, and
    in said second position, light from said first fiber end face is imaged into said third fiber end face and light from said fourth fiber end face is imaged into said fifth fiber end face, said light imaged into said fifth fiber end face being propagated through said fiber loop to said sixth fiber end face and imaged into said second fiber end face.

2. The switch of claim 1 wherein said imaging system is a spherical reflector.

3. The imaging system of claim 2 wherein said reflector is fixed and said translating means translates said fiber end faces relative to said reflector.

4. The switch of claim 3 wherein said translating means comprises
    guide means defining a straight line path, and
    a substrate movable along said path, a group of optical fiber ends terminated by said fiber end faces being mounted on said substrate.

5. The switch of claim 4 wherein said translating means further includes a permanent magnet mounted on said substrate and a solenoid which when activated is adapted to move said substrate along said path.

6. The switch of claim 2 wherein said fiber end faces are fixed and said translating means translates said reflector relative to said fiber end faces.

7. The switch of claim 1 wherein
    said first fiber end face is an end face of an incoming fiber of a node in a fiber optic network,
    said second fiber end face is the end face of a fiber connected to a receiver of said node, and
    said third fiber end face is an end face of an outgoing fiber of said node.

8. The switch of claim 1 wherein said group includes a fourth fiber end face via which light is transmitted to said imaging system, said first, second, third, and fourth fiber end faces being arranged relative to the symmetry of said imaging system so that in said first position light from said first fiber end face is imaged by said system into said second fiber end face and light from said fourth fiber end face is imaged by said system into said third fiber end face and in said second position light from said first fiber end face is imaged by said system into said third fiber end face.

9. The switch of claim 1 wherein said first fiber end face is the end face of an incoming fiber of a node, said second fiber end face is the end face of a fiber connected to a receiver of said node, and said third fiber end face is the end face of an outgoing fiber of said node so that in said first position said incoming fiber is coupled to said receiver and in said second position said incoming and outgoing fibers are coupled.

10. The switch of claim 1 wherein said imaging system is a symmetric reflecting system.

11. The switch of claim 1 wherein said fifth and sixth fiber end faces are positioned along the axis of the reflector to vary the optical attenuation of an optical signal reflected by the reflector into a corresponding fiber loop.

* * * * *